United States Patent [19]

Fremont

[11] Patent Number: 4,890,224
[45] Date of Patent: Dec. 26, 1989

[54] METHOD AND APPARATUS FOR FAULT TOLERANT COMMUNICATION WITHIN A COMPUTING SYSTEM

[75] Inventor: Michael J. Fremont, Palo Alto, Calif.
[73] Assignee: Hewlett-Packard Company, Palo Alto, Calif.
[21] Appl. No.: 879,720
[22] Filed: Jun. 27, 1986
[51] Int. Cl.⁴ .................... G06F 11/16; G06F 13/38
[52] U.S. Cl. .................... 364/200; 370/16; 340/827
[58] Field of Search ... 364/200 MS File, 900 MS File; 371/8, 11, 22; 370/16; 340/825.01, 827, 825.03

[56] References Cited

U.S. PATENT DOCUMENTS

| | | | |
|---|---|---|---|
| 2,459,494 | 1/1949 | Brixner et al. | 340/825.01 |
| 2,936,442 | 5/1960 | Christman et al. | 340/825.01 |
| 4,042,794 | 8/1977 | Lima et al. | 371/22 X |
| 4,159,470 | 6/1979 | Strojny et al. | 371/11 X |
| 4,254,496 | 3/1981 | Munter | 370/16 |
| 4,281,315 | 7/1981 | Bauer et al. | 364/200 X |
| 4,405,978 | 9/1983 | Lange et al. | 364/200 |
| 4,463,421 | 7/1984 | Laws | 364/200 |
| 4,527,270 | 7/1985 | Sweeton | 370/16 X |
| 4,570,220 | 2/1986 | Tetrick et al. | 364/200 |
| 4,627,045 | 12/1986 | Olson et al. | 371/8 X |

Primary Examiner—David L. Clark
Attorney, Agent, or Firm—Alan H. Haggard

[57] ABSTRACT

A method and apparatus for fault tolerant communication among a plurality of I/O controllers and a communication controller using an I/O bus having byte-parallel and bit-serial data lines. Each controller is connected to the bit-serial and byte-parallel data lines and the CPU communication controller is capable of selectively indicating which set of lines shall be used for communicating information. When serial communication is desired, a switching signal is transmitted by the CPU communication controller on the serial data line whereupon the I/O controllers switch communication from the byte-parallel data lines to the bit-serial data line. Serial arbitration conflicts are avoided by allocating a time interval to each I/O controller. Each time interval is divided into 3-bit periods. An arbitrating I/O controller asserts the first itself bit true, asserts the second bit false, and disconnects from the bus during the third bit period to separate in time the modules connected to the bus from each other. The CPU communication controller in an operating system initializes newly-inserted modules and synchronizes unsynchronized modules by generating a signal on the bus for prescribed periods of time after which synchronizing control modules within each I/O controller synchronizes the I/O controller with the rest of the system.

18 Claims, 7 Drawing Sheets

METHOD AND APPARATUS FOR FAULT TOLERANT COMMUNICATION WITHIN A COMPUTING SYSTEM

BACKGROUND OF THE INVENTION

This invention relates generally to data processing equipment and processes and, more particularly, to a method and apparatus for fault-tolerant communication of information among a plurality of information processing elements.

Computers have become an important tool for many businesses because of the ability of even small computers to process vast amounts of data in a short time. In many applications it is important, and often crucial, that the data processing not be interrupted. A failure of a computer system, especially during data communication between the processor and a permanent storage device, can shut down a portion of the related business and can cause considerable loss of data and money. Accordingly, computing systems must provide not only sufficient computing ability to process large amounts of data, but they must also provide a mode of operation which permits data processing to be continued without interruption in the event some component of the system fails.

Information is communicated among elements in a computing system through buses. Buses may comprise a single wire, in which case all information is transferred among the elements in bit-serial format, or it may consist of a plurality of wires which enable information to be transferred in byte-parallel format. In either case, a fault in a single wire or in a component attached to the same wire may cause a failure of the entire computer system. Accordingly, some form of redundancy should be implemented for reliable system operation.

One approach to redundancy is to provide a duplicate bus which may be switched to in the event of primary bus failure. Duplication may be economically feasible when a single-wire, bit-serial bus is used, but these systems are inadequate for applications requiring frequent high data throughput, and the apparent complexity of implementing serial arbitration has discouraged many attempts at constructing a working system. In parallel bus systems, the addition of an extra parallel bus multiplies the amount of hardware necessary for proper operation and greatly increases cost.

One approach in byte-parallel systems is to provide one or more lines as spares in the event that one of the primary lines fails. However, these approaches are often inadequate because the modules may fail when the controlling module attempts to communicate error and reconfiguration information to them over the byte-parallel bus known to have a faulty wire. In some cases, communication with the I/O module may be impossible, and the entire systems fails.

Another shortcoming of sparing is how to test the spare wires before they are actually needed. Conventional devices may not adequately test the spare wires, and a faulty spare is not detected until a module attempts to use it, in which case it is too late.

Once a fault has been detected and analyzed, system operation must often be suspended to fully effect repair. For example, a faulty bus driver in a module usually necessitates module replacement. System operation must often be suspended to initialize and otherwise accommodate the newly inserted module. If the faulty bus driver also caused one of the lines in the bus to fail, so that sparing is required, the problem is compounded by the fact that the newly inserted module is unaware of the new system configuration. At best, this requires the operator to provide sparing information to the newly inserted module and, at worst, the system fails again because the newly inserted module cannot communicate with the rest of the system.

Finally, if a fault arises from an unsynchronized module, it is desirable that the computing system resynchronize the module automatically without operator intervention. Approaches to the problem often result in programs having complicated algorithms and intricate hardware to implement them. This increases costs, and the additional hardware increases the chance of more errors occurring.

SUMMARY OF THE INVENTION

The present invention contemplates the use of a fault-tolerant I/O bus having byte-parallel and bitserial data lines which are capable of transmitting data selectively in byte-parallel format or in bit-serial format. In one embodiment of the present invention, a parallel bus comprising a plurality, e.g., eight data lines, is adapted to communicate data among a plurality of I/O controllers in byte-parallel format during normal operation. A serial bus comprising a serial data line for transmitting data among the plurality of I/O controllers in bit-serial format operates when a fault is detected in the byte-parallel lines.

A CPU communication controller is connected to the bit-serial and byte-parallel lines for selectively indicating which set of lines shall be used for communicating information. This is accomplished by sending a transaction with a valid CRC code on the serial bus to the I/O controllers when serial operation is desired. When the controllers receive this code on the serial bus, they switch from the parallel bus to the serial bus and continue operation in bit-serial format. After the error has been analyzed and corrected, the modules are instructed through the serial bus to switch back to the parallel bus, whereupon they resume normal byte-parallel operation.

To enhance reliability of the system, a spare data line is included which may either be used to supplement the parallel bus or as a replacement for the serial bus. While the I/O controllers are operating through the serial bus, the sparing information is sent to them before they are instructed to switch back to the parallel bus. Therefore, when the switch is ultimately made, the modules know the new system configuration, and the risk of error by transmitting such information over the parallel bus is eliminated.

To ensure reliability of the system, the CPU communication controller occasionally tests the serial bus by sending a transaction with an invalid CRC code on the serial bus to the I/O controllers. Since the CRC code is invalid, the modules do not switch from the parallel to the serial bus, and the CRC code computed by each module can be read from each module and compared with the expected CRC code to determine if the serial bus and its corresponding receiving logic are operating correctly.

To avoid arbitration conflicts when the system operates on the serial bus, a novel arbitration scheme is implemented wherein a series of time intervals are allocated in such a way that each time interval corresponds to a unique I/O controller. Each time interval comprises triplets of three bit periods each. When a module wishes to arbitrate, it asserts the first bit of its assigned triplet true. During the second bit period, the arbitrating module asserts the bit false. As used herein, a signal is asserted true when it is driven to a low electrical state. A signal is asserted false or otherwise considered disasserted when the signal is driven to, or passively left at, a high electrical state. Finally, the module disconnects itself from the bus during the third bit period. After the module disconnects itself from the bus, the bus remains in substantially the same electrical state as it was during the second bit period because the bus is designed using pull-up resistors to keep the bus in a high electrical state until actively asserted low. This allows the bus to contain empty slots, and subsequent modules need not take any action if they wish not to arbitrate. By disconnecting itself from the bus during the third bit period, a module is separated in time from other modules also connected to the bus, and hence the modules avoid electrical conflict. This ensures that two modules cannot simultaneously become transaction master (two transactions cannot occur simultaneously) and ensures forward progress in that arbitration, regardless of priority, will eventually succeed.

In order to initialize newly inserted modules, the CPU communication controller generates a signal for a prescribed time interval. Each newly inserted module recognizes this time-dependent signal and synchronizes itself when the signal terminates. Afterwards, the communication controller initializes the newly inserted modules.

If a new module is inserted into a system operating with the spare line active, the CPU controller commands a switch to the serial bus (which automatically synchronizes the newly inserted module), sends the sparing information to the newly inserted module, commands a switch back to the parallel bus, and proceeds with initialization.

Finally, if the CPU communication controller detects an unsynchronized module, it generates a signal for another prescribed time interval. All modules disconnect themselves from the bus and, when the signal terminates, they synchronize themselves accordingly.

The invention will be better understood by reference to the following detailed description taken in conjunction with the accompanying drawings.

DETAILED DESCRIPTION OF THE PREFERRED EMBODIMENTS

Figure 1:
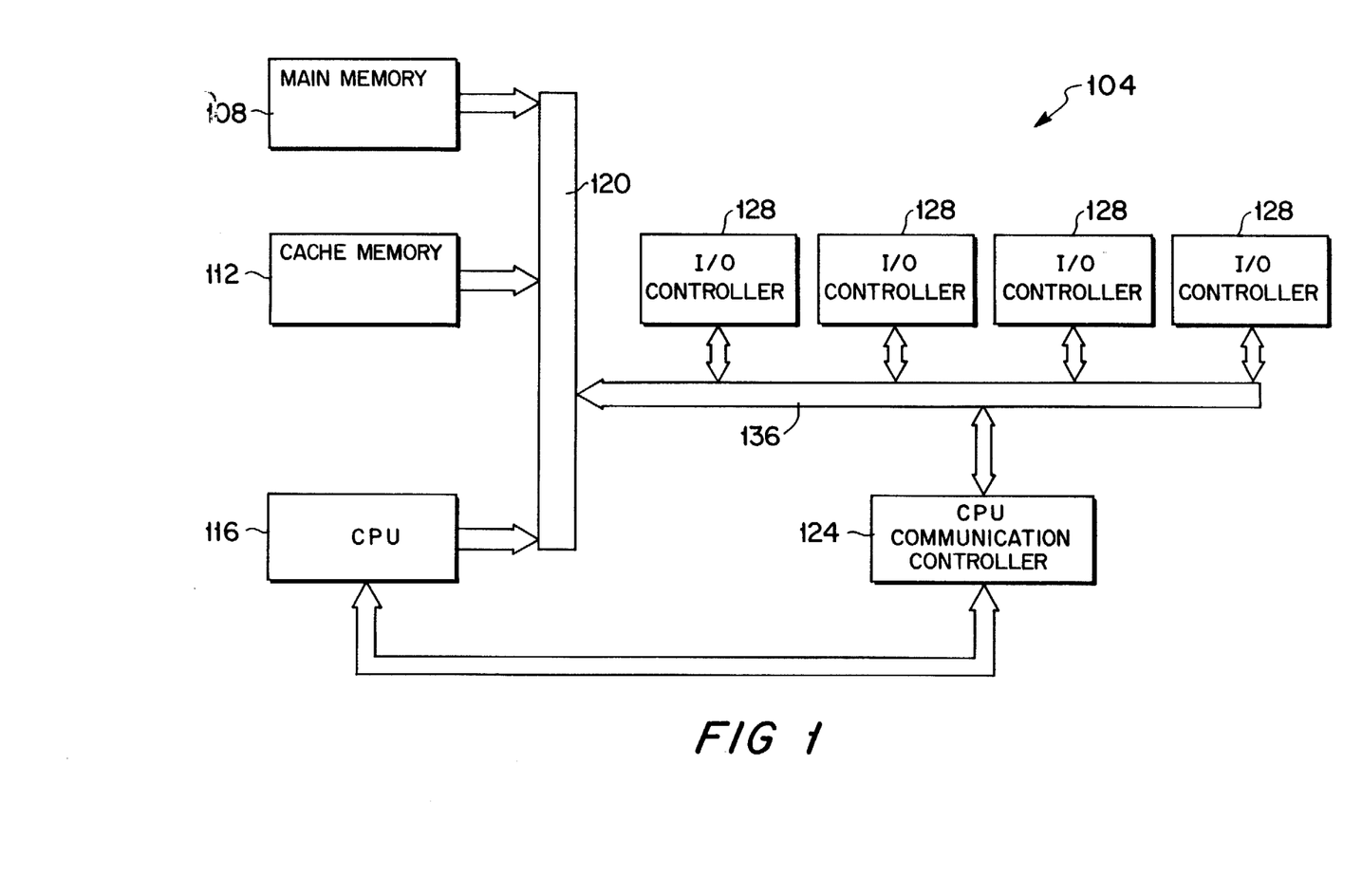
FIG. 1 is a diagram illustrating a data processing system according to the present invention.

FIG. 1 shows a data processing system generally designated as 104. Data processing system 104 comprises a main memory 108, a cache memory 112, and a CPU 116 which together communicate over a system bus 120. A CPU communication controller 124 communicates with a plurality of I/O controllers 128 through an I/O bus 136. CPU Communication controller 124 and I/O bus 136 allow communication between main memory 108, cache memory 112, CPU 116, and I/O controllers 128.

Figure 2:
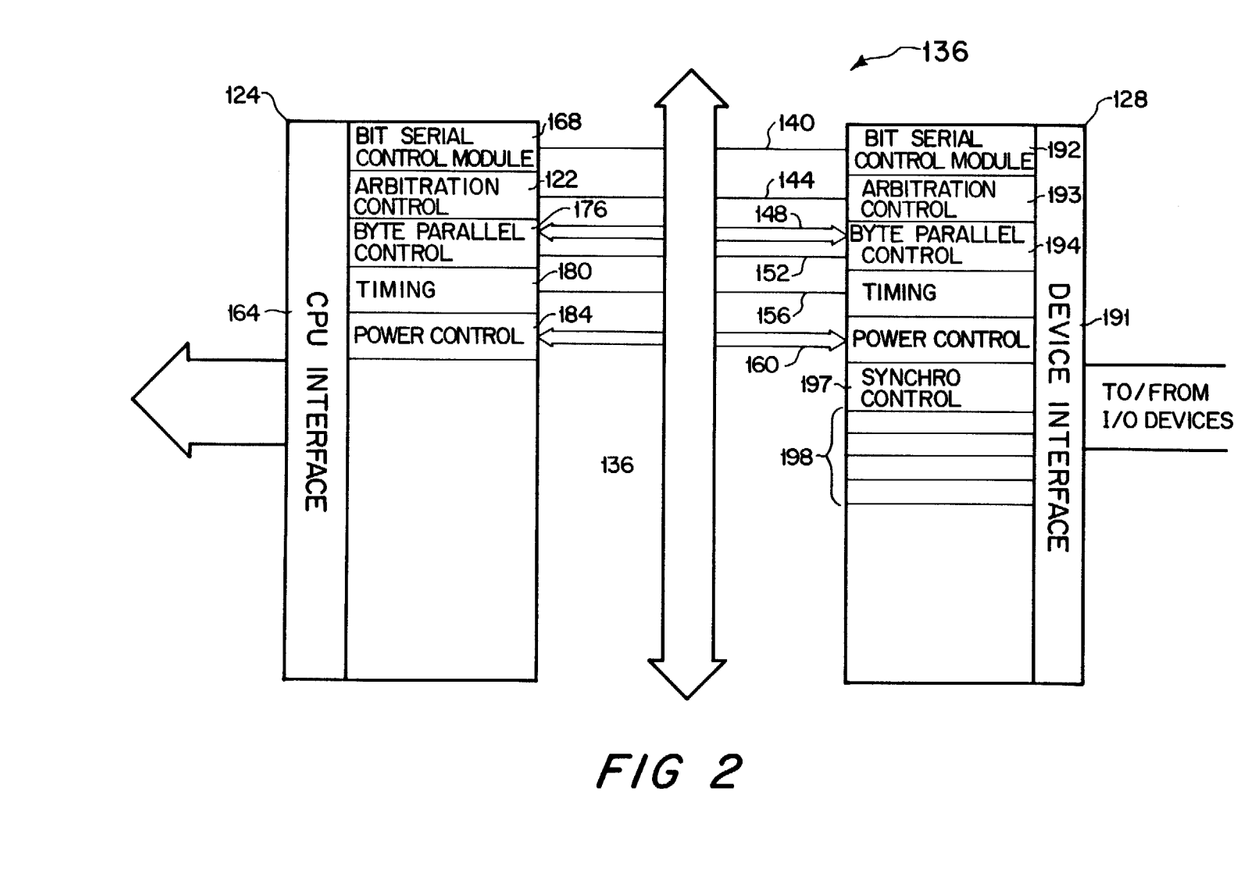
FIG. 2 is a detailed diagram of the interface between the CPU communication controller of FIG. 1A and an I/O controller according to the invention.

FIG. 2 is a detailed view of CPU communication controller 124, an I/O controller 128, and I/O bus 136. A serial data line 140 is for communicating signals from CPU communication controller 124 to I/O controller 128 in bit-serial format. A slot identification line 144 is for communicating slot identification to the I/O controllers during the initialization sequence after power-up. Slot identification is used to establish priority of the I/O controllers for priority dependent transactions (e.g., arbitration). A plurality, e.g., eight CAD lines 148 are for transmitting multiplexed control, address, and data (CAD) information between CPU communication controller 124 and I/O controller 128. A spare line 152 is used as a back-up for one of the CAD lines 148. A clock line 156 is for timing events on the serial bus (and perhaps internal board functions). Finally, a plurality of power lines 160 are provided for power distribution to I/O controller 128.

CPU Communication controller 124 acts as an interface between I/O bus 136 and CPU 116. CPU Communication controller 124 comprises a CPU interface module 164; a bit-serial control module 168, coupled to serial data line 140; an arbitration control module 172, coupled to a slot identification (ID) line 144; a byte-parallel control module 176, coupled to CAD lines 148 and spare line 152; a timing module 180, coupled to clock line 156; and a power control module 184, coupled to power lines 160.

Similarly, I/O controller 128 comprises a device interface module 191; a bit-serial control module 192, coupled to serial data line 140; an arbitration control module 193, coupled to slot ID line 144; a byte-parallel control module 194, coupled to CAD lines 148 and spare line 152; a timing module 195, coupled to clock line 156; a power control module 196, coupled to power lines 160; a synchronizing control module 197; and a plurality of registers 198.

OPERATION:

The Transaction Sequence

Figure 3:
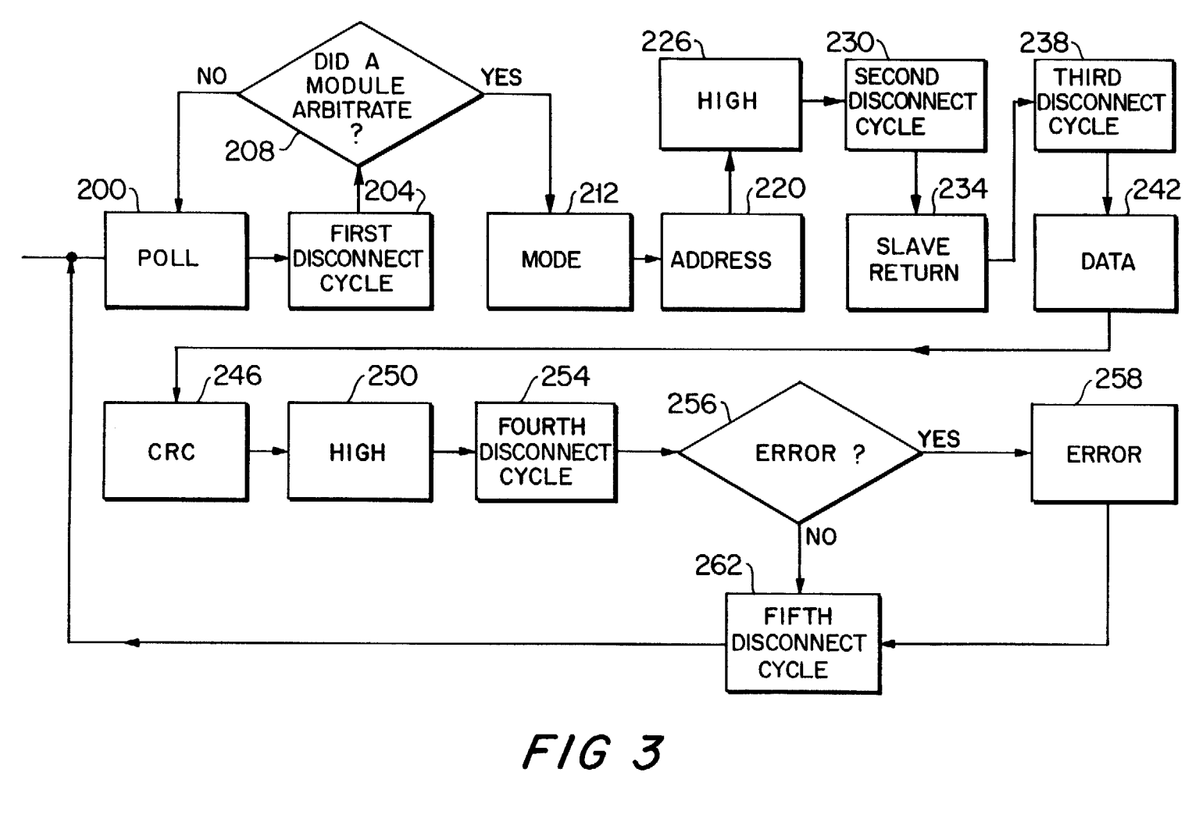
FIG. 3 is a flow chart illustrating a transaction sequence according to the invention.

One embodiment of a transaction sequence on I/O bus 136 is shown in FIG. 3. The transaction sequence begins with a poll cycle 200. When CPU communication controller 124 or an I/O controller 128 wishes to arbitrate, it waits for a poll cycle. The controller associates the slot identification information originally received on slot ID line 144 during initialization with a CAD line 148 assigned to that priority. Slot assignment is as follows:

|         | Slot |
|---------|------|
| CAD (0) | 0    |
| CAD (1) | 1    |
| CAD (2) | 2    |

-continued

| | Slot |
|---|---|
| CAD (3) | 3 |
| CAD (4) | 4 |
| CAD (5) | 5 |
| CAD (6) | 6 |
| CAD (7) | 7 |

During the poll cycle, the controller asserts true the CAD line 148 corresponding to its assigned priority.

After poll cycle 200, the bus enters a first disconnect cycle 204. Disconnect cycles separate (in time) a driver in one module, which may be turning itself off at a clock edge, and a driver in another module, which may be turning itself on at the same edge. During a disconnect cycle, all modules must turn off their outputs and receive data only. Thus, there are no driver conflicts which, in turn, prevent contention-induced noise and increase driver reliability. A check is then made in a step 208 to determine whether any module attached to the bus arbitrated during poll cycle 200. If no module arbitrated, the bus reverts to poll cycle 200 again. If a module did arbitrate, the arbitration decision is made during first disconnect cycle 204, and the bus enters a mode cycle 212. During this cycle, the module which gained control of the bus transfers mode information to the slave module through CAD lines 148.

After mode cycle 212, the bus passes through one or more address cycles 220. During address cycle 220, the bits of the slave address are transmitted on CAD (0 . . . 7).

During a high cycle 226, the master asserts the CAD (0 . . . 7) lines false. The CAD lines 148 are passively pulled to a high voltage by a resistance, so they will thereafter remain false until actively driven true. This facilitates implementation of wire-ORing or optionally driven cycles (such as polls).

After a second disconnect cycle 230, the bus enters one or more slave return cycles 234. During the slave return cycle 234, the addressed slave (if there is one) asserts the following CAD lines:

CAD (0) SLAVE-ACK
CAD (1) SLAVE-WAIT
CAD (2) SLAVE-BUSY
CAD (3 . . . 7) RESERVED

The addressed slave must assert SLAVE-ACK true during the slave return cycle 234. During a broadcast transaction, all modules are addressed as slaves; in this case, all modules will assert SLAVE-ACK true. SLAVE-ACK must be asserted true during the first and all subsequent slave-return cycles 234.

If the slave requires more time before it can accept data (during a write) or source data (during a read), it asserts SLAVE-WAIT true. The bus remains in the SLAVE-RETURN cycle until SLAVE-WAIT is asserted false. SLAVE-WAIT may not be asserted true for more than sixteen clock cycles, and SLAVE-WAIT may not be asserted true during broadcast transactions. SLAVE-WAIT may be asserted true for either no slave-return cycle 234 or for all but the last slave-return cycle 234.

If a slave cannot respond to the transaction at the current time because it is not ready to source or sink data, it asserts SLAVE-BUSY true. The transaction will be continued, but all data transferred will be ignored. The master of the transaction retries the transaction later. SLAVE-BUSY may be asserted true during any slave-return cycle and must be asserted true for all following slave-return cycles. SLAVE-WAIT and SLAVE-BUSY may be asserted true during the same transaction. SLAVE-BUSY may not be asserted true during broadcast transactions.

During slave return cycle 234, CAD (3 . . . 7) are reserved. All modules must turn off their output drivers and receive data only.

After a third disconnect cycle 238, the bus enters one or more data cycles 242. During data cycle 242, the data are transferred starting at the slave address and counting upwardly.

After data cycle 242, the source transmits a cyclic redundancy check (CRC) code in one or more CRC cycles, 246, respectively. The CRC code is computed over all of the previous cycles of the transaction, including poll cycles, and the computation may or may not include disconnect cycles depending on design considerations. One possible CRC polynomial is $X^{16}+X^{12}+X^5+X$, but other polynomials may be used as the circumstance requires. After the CRC code is sent, the CAD lines 148 are pulled to a high voltage during a high cycle 250 and then disconnected during a fourth disconnect cycle 254.

If a source, sink, or third party detected, in a step 256, a protocol, data, or a CRC error during the transaction, or an internal error which makes it impossible to complete the transaction correctly, then one or more error cycles 258 may be performed. Otherwise, the lines remain disconnected.

Finally, the bus enters a fifth disconnect cycle 262, and then the sequence starts over with poll cycle 200.

Figure 4:
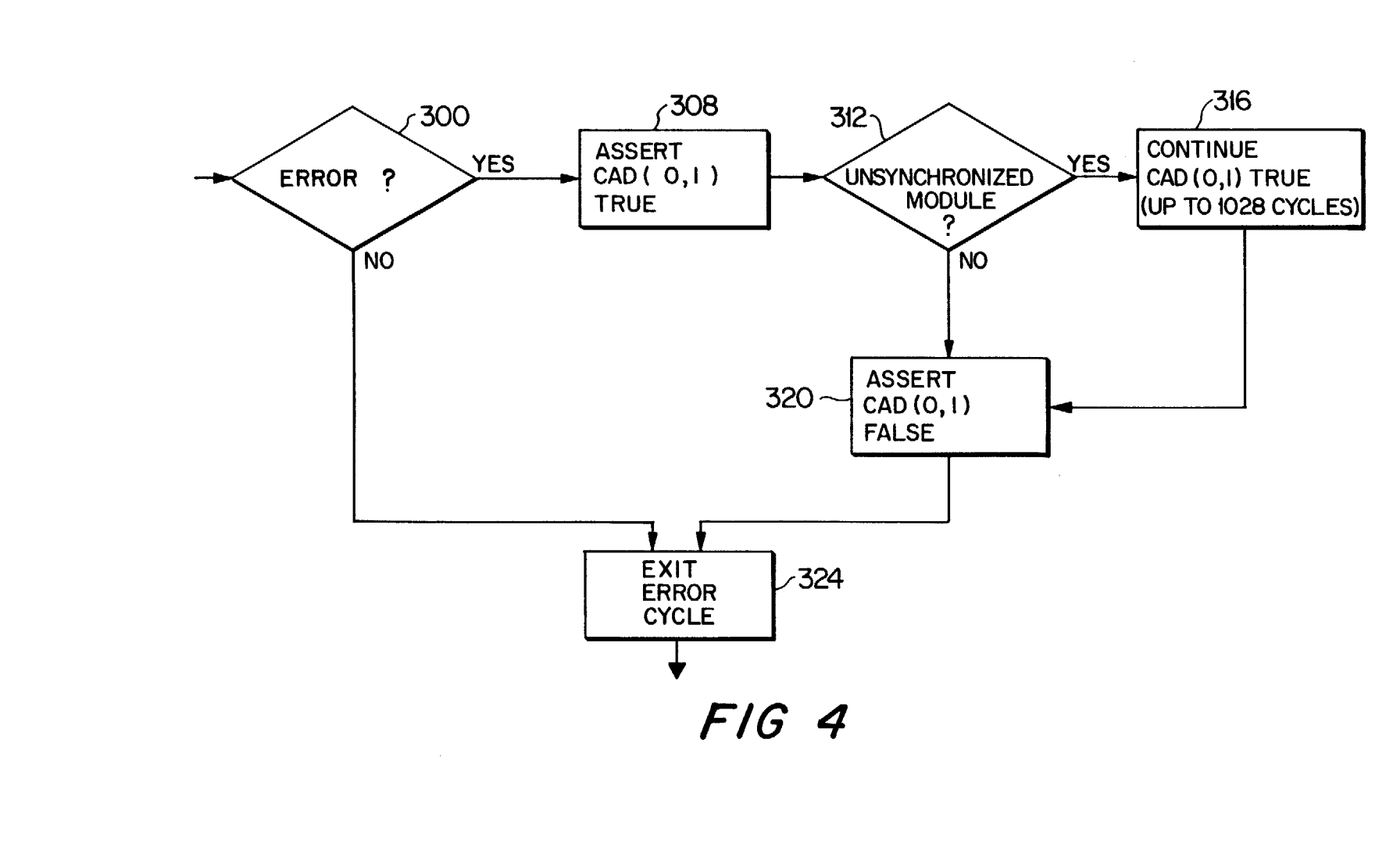
FIG. 4 is a flow chart illustrating an error cycle according to the invention.

FIG. 4 illustrates a typical error cycle according to the invention.

If it is determined in a step 300 that an error has occurred, then the module asserts CAD (0, 1) true in a step 308. If any bits during error cycle 258 are asserted true, the bus stays in the error state until all bits are asserted false. Normally, modules may assert error true for only one cycle, then they must assert error false. An exception to this may occur when the software in a processor module determines in a step 312 that modules on the bus are unsynchronized. In this case, it may assert CAD (0, 1) true for up to 1,028 clock cycles in a step 316. The bus then remains in the error state as long as error is asserted true and ensures that unsynchronized modules recognize the error signal. Finally, CAD (0, 1) are asserted false in a step 320, and error cycle 258 is exited in a step 324. A module which encounters an error while bus master may optionally retry the transaction.

Parallel Bus Emulation

As discussed earlier, I/O bus 136 is divided into a parallel bus and a serial bus (i.e., CAD lines 148 and serial line 140, respectively). Normally, all operations occur on the parallel bus. The serial bus provides an alternate data path for diagnosing parallel bus problems and for sending information (at a slower rate) when the parallel bus has failed. For instance, when a parallel bus wire or, more likely, one of its drivers is faulty, the serial bus can be used to diagnose the fault and then command sparing action for the parallel bus.

The serial bus and parallel bus may or may not operate concurrently as the circumstances requires. Except for the command that causes operation to move to the serial bus from the parallel bus, or during serial bus testing, ordinarily only one bus operates at any given time.

Figure 5:
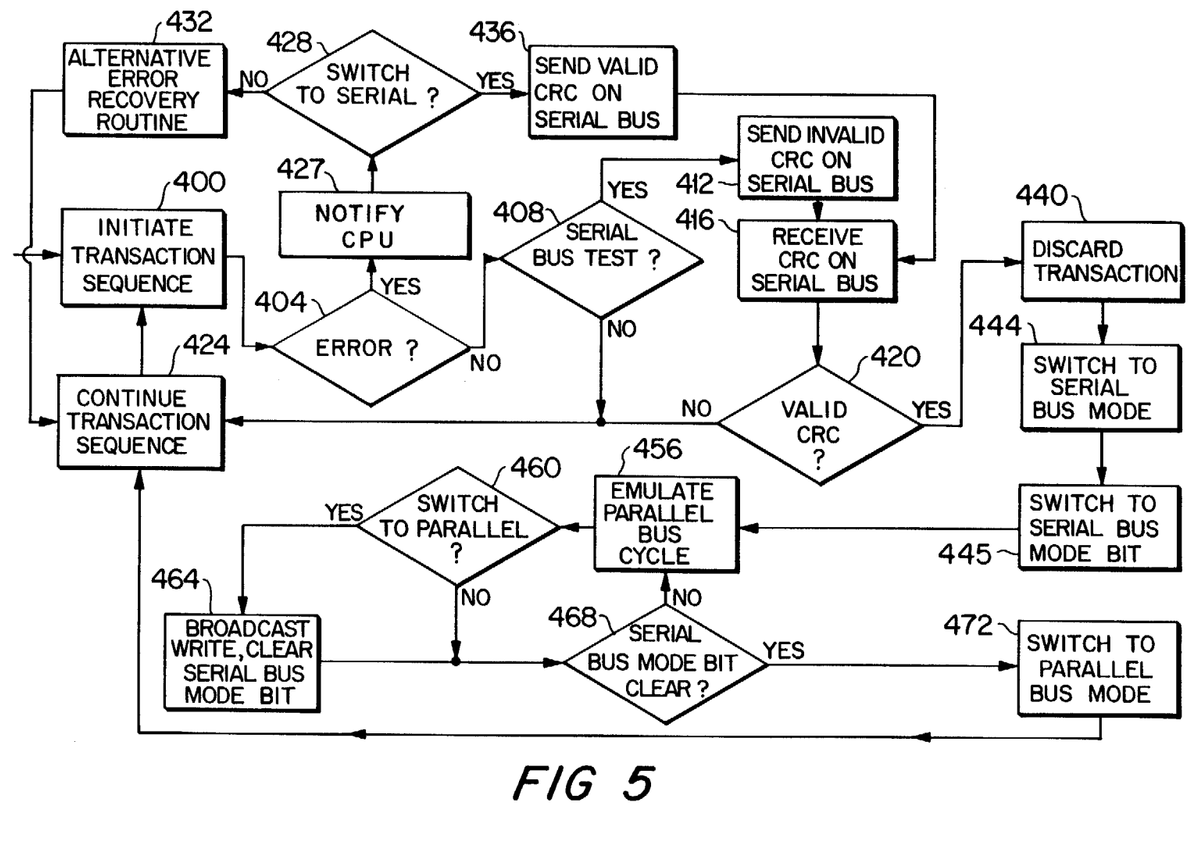
FIG. 5 is a flow chart illustrating a method of switching between the parallel bus and the serial bus according to the invention.

A method of switching between the parallel bus and the serial bus is shown in FIG. 5. As shown therein, a new transaction sequence is initiated in a step 400. If it is ascertained in a step 404 that no module asserted error during error cycle 258, then software in CPU 116 may decide in a step 408 to test the serial bus. The serial bus can be tested by sending a message with an invalid CRC code on the serial line 140 in a step 412. Such a message does not cause modules to switch to the serial bus. Instead, the modules receive the CRC on the serial bus in a step 416 and, when it is determined in a step 420 that the CRC is invalid, the transaction sequence is continued in a step 424, and normal operation continues. The CRC code computed by the receiving modules can be read over the parallel bus by CPU communication controller 124 from one of the registers 198 in each I/O controller 128 in a later cycle and compared with the CRC code originally computed by CPU communication controller 124 to determine if the serial bus and its corresponding receiving logic are operating correctly.

If, however, an error has been ascertained in a step 404, CPU communication controller 124 interrupts CPU 116 in a step 427, and software in CPU 116 ascertains in a step 428 whether or not a switch to the serial bus is appropriate. If the type of error detected may be corrected using alternative error recovery routines, then such routines are executed in a step 432 and the transaction sequence is continued in a step 424.

If it is ascertained in step 428 that a switch to serial mode is desirable (e.g., to diagnose the problem), then a message with a valid CRC code is sent in a step 436 on serial line 140. When the module receives the CRC code in a step 416 and determines that it is valid in a step 420, the transaction which sent the valid CRC code is discarded in a step 440, and all modules switch to serial bus mode in a step 444. A prescribed bit is set in one of the I/O controller 128 registers 198 in a step 445 to maintain the controller in bit-serial mode thereafter and the system begins emulation of parallel bus operation in a step 456. Any transaction that can be done on the parallel bus may also be done on the serial bus.

If, during serial bus operation, it is determined that parallel bus operation may resume in a step 460, a broadcast write is performed in a step 464 which clears the prescribed bit in each I/O controller register 124 which originally maintained the controllers in serial mode. When this bit is determined by each module to be clear in a step 468, the modules switch back to parallel bus mode in a step 472, and the transaction sequence is continued in a step 424. During step 464, sparing information may be sent over serial line 140 so that each controller 128 knows the new configuration of the system and may substitute spare line 152 accordingly.

Figure 6:
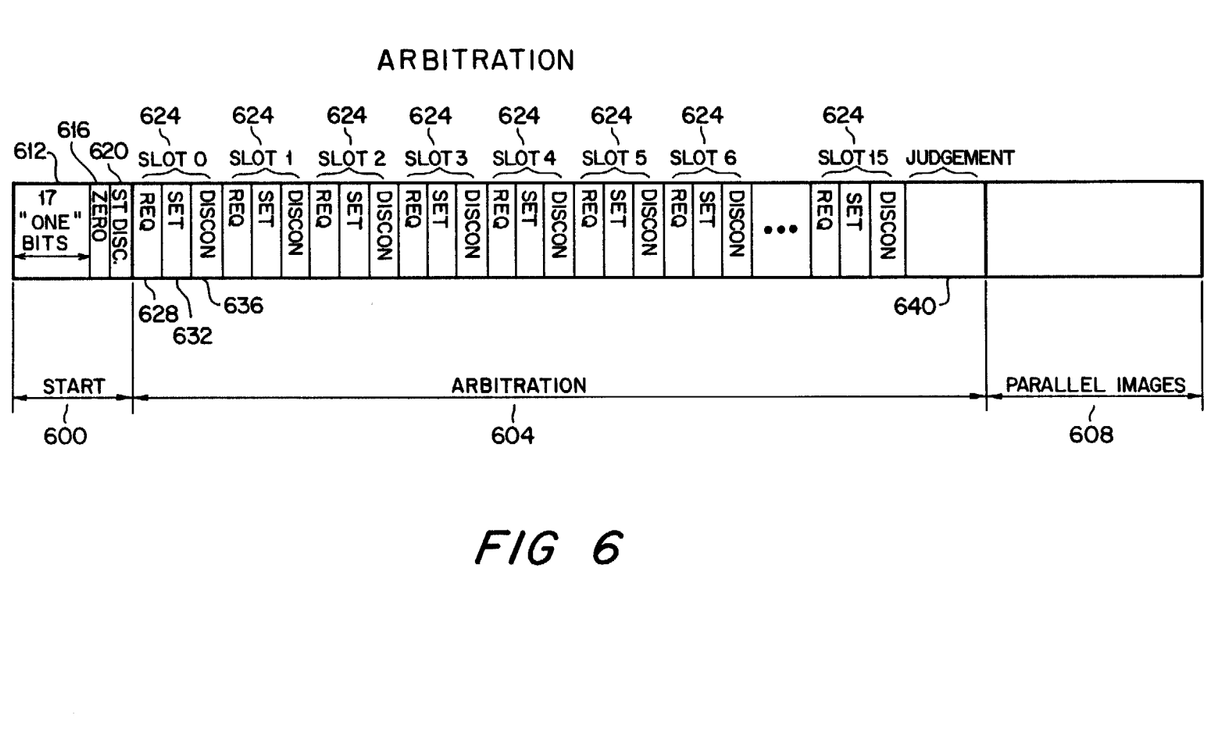
FIG. 6 is a diagram illustrating a serial arbitration sequence according to the invention.

FIG. 6 illustrates the protocol for parallel bus emulation. The protocol includes a start sequence 600, an arbitration sequence 604, and a parallel images sequence 608. A transmission is begun when a start sequence is sent. The start sequence consists of 17 consecutive one bits 612, followed by a zero bit 616 and then a start-disconnect bit 620 wherein all modules disconnect themselves from the bus.

Arbitration commences after the start field is sent on the serial bus. The arbitration field is divided into 16 triplets 624, each containing three bit periods. Each triplet is "owned" by a bus slot, so that triplet zero is owned by slot zero, triplet one is owned by slot one, and so on. Triplets are placed on the bus in slot order. Each triplet consists of a request bit 628, a set bit 632, and an arbitration disconnect bit 636. A module wishing to arbitrate asserts true the request bit 628 during its allocated triplet of arbitration. It then disasserts (asserts false) set bit 632 to cause a reset and passively allows arbitration disconnect bit 636 to remain reset by disconnecting itself from the bus. The disassertion and subsequent disconnect leave the bus in a disasserted, or disconnected, state so that, in subsequent triplets, modules not wishing to arbitrate (or slots without modules) need not drive the bus. After the last module in any slot arbitrates, arbitration control 193 in each controller 128 adjudicates the arbitration in a judgment field 640, and parallel emulation continues in parallel images field 608. Parallel images field 608 corresponds exactly to the signals on the parallel bus, except that the information is presented in bit-serial fashion rather than byte-parallel. For each parallel bus cycle of eight transmitted bits, the serial bus has eight bus cycles, each of one bit, starting with the most significant bit. Thus, CAD (0) is sent first, then CAD (1), and so on.

On-Line Repair

Figure 7:
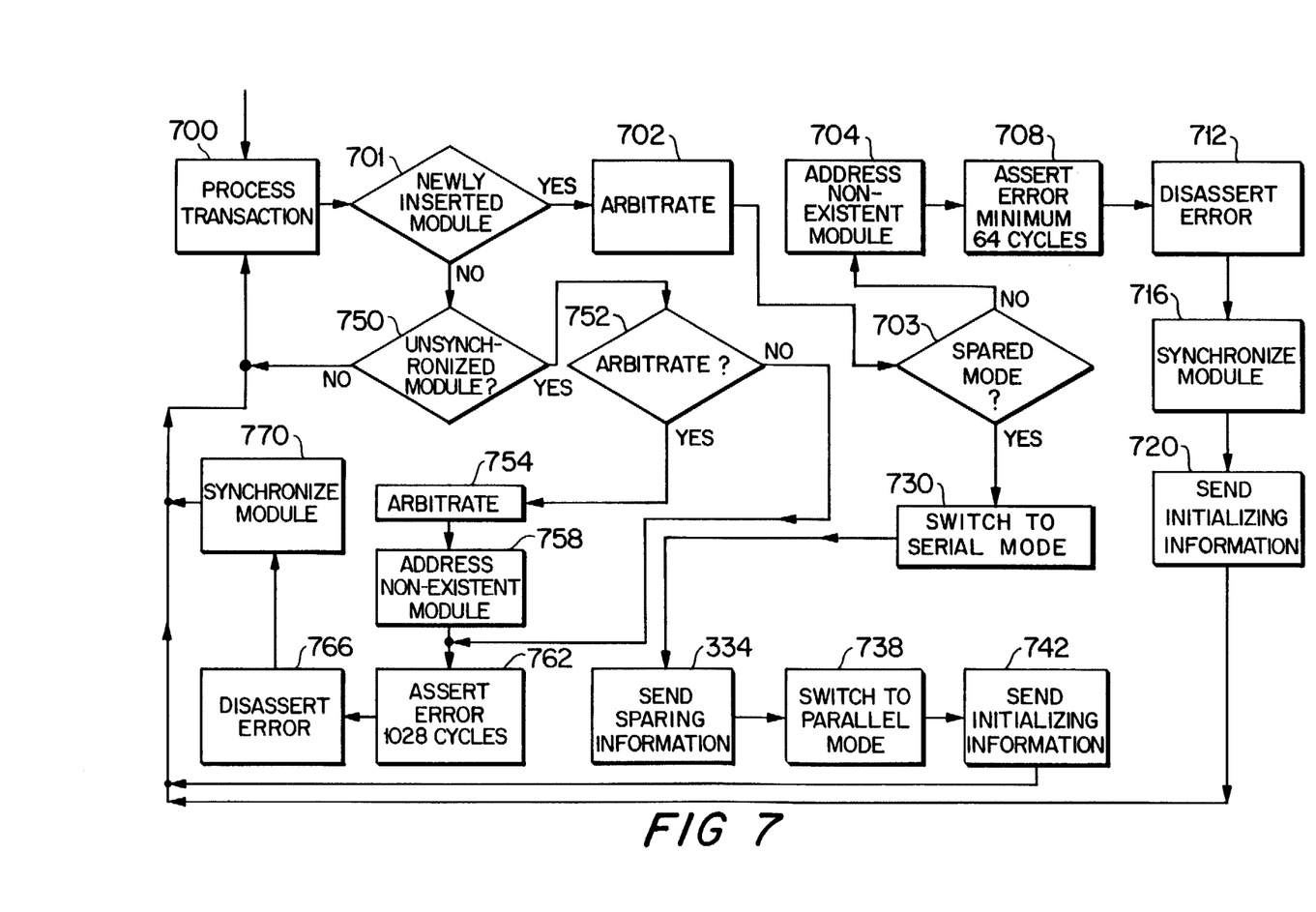
FIG. 7 is a flow chart illustrating module synchronization and initialization according to the invention.

Modules may be inserted into a powered and operated bus 136 as long as they do not electrically disturb the bus. Accordingly, the newly inserted module must be initialized and synchronized with the running system. Furthermore, should the bus be operating in a spared mode, the newly inserted module must be informed of this fact and instructed of the proper system configuration. FIG. 7 illustrates how this may be done.

Normal transaction processing occurs in a step 700. When it is determined in a step 701 that a newly inserted module is connected to the bus 136 (e.g., by software or hardware in CPU 116 or CPU communication controller 124 periodically attempting to read from the module at that address ), CPU communication controller 124 arbitrates in a step 702 over succeeding transactions until it becomes bus master. When CPU communications controller 124 succeeds in becoming bus master, it ascertains in a step 703 whether the system is in spared mode. If not, CPU communication controller 124 sends a dummy transaction to a non-existent address in a step 704 with error asserted at the appropriate places in the protocol. Error is asserted for at least 64 cycles in a step 708. Seeing error asserted for this long causes synchronization control 197 in each I/O controller 128 to synchronize itself to bus 136, after error is disasserted in a step 712, in a step 716. Once the newly inserted module is synchronized, CPU communication controller 124 sends initializing information to it in a step 720, and normal transaction processing resumes.

If the parallel bus is operating in spared mode, then communication controller 124 must initiate a switch to the serial bus to send sparing information to the newly inserted module before the newly inserted module can be initialized. If it is determined in step 703 that the system is operating in spared mode, then the I/O controllers 128 are instructed to switch to serial mode in a step 730 (which automatically synchronizes the newly inserted module by virtue of the timing for the switch), sparing information is sent over the serial bus in a step 734, the I/O controllers 128 are instructed to switch back to parallel mode in a step 738, initializing information is sent in a step 742, and normal processing resumes.

If software or hardware in CPU 116 or communication controller 124 detects that a module may be unsynchronized, but not newly inserted, in a step 750 (e.g., the module responds incorrectly) then it is ascertained in a step 752 whether to arbitrate and assert error during normal transaction processing or to immediately assert error. Asserting error during normal transaction processing is desirable when the unsynchronized module has only a minimal effect on system operation whereas immediate assertion of error is desirable when the unsynchronized module is significantly affecting system operation. If the decision is made to assert error during normal transaction processing, CPU communication controller 124 arbitrates in a step 754 over succeeding transactions until it becomes bus master. When CPU communication controller 124 succeeds in becoming bus master, it sends a dummy transaction to a non-existent address in a step 758 with error asserted at the appropriate place on the protocol. If the decision was made to assert error immediately then error is asserted regardless of the current cycle in the transaction sequence.

To drive all modules off the bus, error may be asserted for up to 1,028 clock cycles in a step 762. Asserting error this long ensures that all modules recognize the signal as an error signal. After error is disasserted in a step 766, the modules are synchronized in a step 770, and normal processing resumes.

The invention has now been described with reference to specific embodiments. Various modifications and substitutions will be apparent to persons skilled in the relevant arts. For example, any control and processing functions described may be effected by software or hardware in either CPU 116 or CPU communication controller 124. More than one spare line 152 may be provided, and codes other than CRC codes may be used to initiate parallel bus emulation. Accordingly, it is not intended that the invention be limited except as provided by the appended claims.

What is claimed is:

1. Apparatus for communicating information among a plurality of information processing elements comprising:
   byte-parallel communicating means, coupled to each of the information processing elements in the plurality of processing elements, for communicating information among the plurality of information processing elements in byte-parallel format;
   bit-serial communicating means, coupled to each of the information processing elements in the plurality of processing elements, for communicating information among the plurality of information processing elements in bit-serial format; and
   selecting means, coupled to the bit serial communicating means, for selecting for every information processing element in the plurality of processing elements which information communicating means shall communicate information, the selecting means including means for communicating a switching signal through the bit-serial communicating means upon detection of a fault in communication of information through the byte-parallel communicating means;
   wherein upon receipt of the switching signal from another information processing element the selecting means selects the bit serial communicating means to communicate information, information then being exclusively communicated through the bit-serial communicating means and not through the byte-parallel communicating means.

2. Apparatus as in claim 1 further comprising an information storage element within each information processing element, wherein the selecting means includes means for storing a value in each information storage element, and wherein each exclusive communication means includes means for selectively communicating information through the byte-parallel communicating means when the information storage element contains a prescribed value.

3. Apparatus as in claim 1 further comprising:
   timing means, coupled to each of the information processing elements in the plurality of processing elements, for timing events synchronously through the indicated information communication means;
   means coupled to the timing means, for detecting an unsynchronized information processing element; and
   means, coupled to each information processing element and responsive to the detecting means, for indicating the existence of an unsynchronized information processing element.

4. Apparatus as in claim 3 wherein each information processing element includes means, responsive to the unsynchronized element indicating means, for synchronizing the information processing element with the timing means.

5. Apparatus as in claim 4 wherein the unsynchronized element indicating means comprises means for communicating a synchronizing signal through a selected information communication means for a prescribed time interval.

6. Apparatus as in claim 1 further comprising:
   timing means for timing events through the bit-serial communication means, the timing means including means for establishing a series of time intervals, each time interval being unique to an information processing element.

7. Apparatus as in claim 6 wherein a priority is assigned each information processing element and each information processing element further comprises:
   arbitration signal transmitting means for selectively transmitting an arbitration signal through the bit-serial communicating means during the time interval assigned to that information processing element; and
   means for determining that information processing element is the highest priority information processing element transmitting an arbitration signal during the series of time intervals.

8. Apparatus as in claim 7 wherein the time interval comprises first and second subintervals and each arbitration signal transmitting means includes:
   means for transmitting a first signal during the first subinterval; and
   means for transmitting a second signal during the second subinterval.

9. Apparatus as in claim 8 wherein the time interval further comprises a third subinterval subsequent to the first and second subintervals, and each arbitration signal generating means includes means for disconnecting itself from the bit-serial communicating means during the third subinterval.

10. A method for communicating information among a plurality of information processing elements coupled to a bit-serial bus and a byte-parallel bus comprising the steps of:

communicating information among the plurality of information processing elements through the byte-parallel bus;

transmitting a first signal on the bit-serial bus; and in response to the first signal, ceasing communication of information among the plurality of information processing elements through the byte-parallel bus, and communicating information among the plurality of information processing elements through the bit-serial bus.

11. A method as in claim 10 further comprising the steps of:

transmitting a second signal on the bit-serial bus; and in response to the second signal, ceasing communication of information among the plurality of information processing elements through the bit-serial bus, and communicating information among the plurality of information processing elements through the byte-parallel bus.

12. A method as in claim 10 further comprising the steps of:

transmitting a third signal on the bit-serial bus; and in response to the third signal, communicating information among the plurality of information processing elements through a prescribed subset of a plurality of information transfer elements in the byte-parallel bus.

13. A method for initializing an uninitialized information processing element in an operating information processing system having a plurality of information processing elements coupled to a bit-serial bus and a byte-parallel bus having a plurality of information transfer elements comprising the steps of:

communicating information among the plurality of information processing elements through the byte-parallel bus;

transmitting a first signal on the bit-serial bus;

in response to the first signal, communicating information among the plurality of information processing elements through the bit-serial bus;

communicating a configuration signal through the bit-serial communicating means the configuration signal indicating which subset of information transfer elements shall be used for communicating information;

transmitting a second signal on the bit-serial bus;

in response to the second signal, communicating information among the plurality of information processing elements through the indicated subset of information transfer elements of the byte-parallel bus; and initializing the uninitialized information processing element.

14. Apparatus for communicating information among a plurality of information processing elements comprising:

byte-parallel communicating means, coupled to each of the plurality of information processing elements for communicating information among the plurality of information processing elements in byte-parallel format;

bit-serial communicating means, coupled to each of the plurality of information processing elements, for communicating information among the plurality of information processing elements in bit-serial format; and means, coupled to the bit-serial communicating means, for communicating a first switching signal through the bit-serial communicating means;

wherein each information processing element includes means, responsive to the first switching signal, for ceasing communication of information through the byte-parallel communicating means, and for selectively communicating information through the bit-serial communicating means.

15. An apparatus as in claim 14 additionally comprising means, coupled to the bit-serial communicating means, for communicating a second switching signal through thee bit-serial communicating means;

wherein each information processing element includes means, responsive to the second switching signal, for ceasing communication of information through the bit-serial communicating means, and for selectively communicating in formation through the byte-parallel communicating means.

16. An apparatus as in claim 14 wherein:

the byte-parallel communicating means includes a plurality of information transfer elements;

each information processing element transfers information through the byte-parallel communicating means using a first subset of information transfer elements from the plurality of information transfer elements; and the apparatus additionally comprises means for communicating a third switching signal through the bit-serial communicating means; and each information processing element includes means, responsive to the third switching signal for ceasing the transfer of information using the first subset of information transfer elements and for transferring information through the byte-parallel communicating means using a second subset of information transfer elements from the plurality of information transfer elements.

17. Apparatus for communicating information among a plurality of information processing elements comprising:

byte-parallel communicating means, coupled to each of the information processing elements in the plurality of processing elements, for communicating information among the plurality of information processing elements in byte-parallel format, the byte-parallel communicating means including a plurality of information transfer elements, the byte-parallel communicating means communicating information through a subset of the plurality of information transfer elements, the subset not including all the transfer elements;

means, coupled to each of the information processing elements in the plurality of processing elements, for communicating information among the plurality of information processing elements in bit-serial format; and selecting means, coupled to the bit serial communicating means, for selecting for every information processing element in the plurality of processing elements which information communicating means shall communicate information, the selecting means including subset selection means for selecting a selected subset of information transfer elements to be used for communicating information, the subset selection means including means for communicating a configuration signal through the bit-serial communicating means;

wherein the byte-parallel communicating means includes means, responsive to the configuration signal, for selectively communicating information through the selected subset of information transfer elements.

18. Apparatus as in claim 17 wherein when a transmission error occurs because of a fault in transmission through a first transfer element in the plurality of transfer elements occurs, the selection means selects a subset of the plurality of information transfer elements which does not include the first transfer element.

* * * * *